Figure 1:
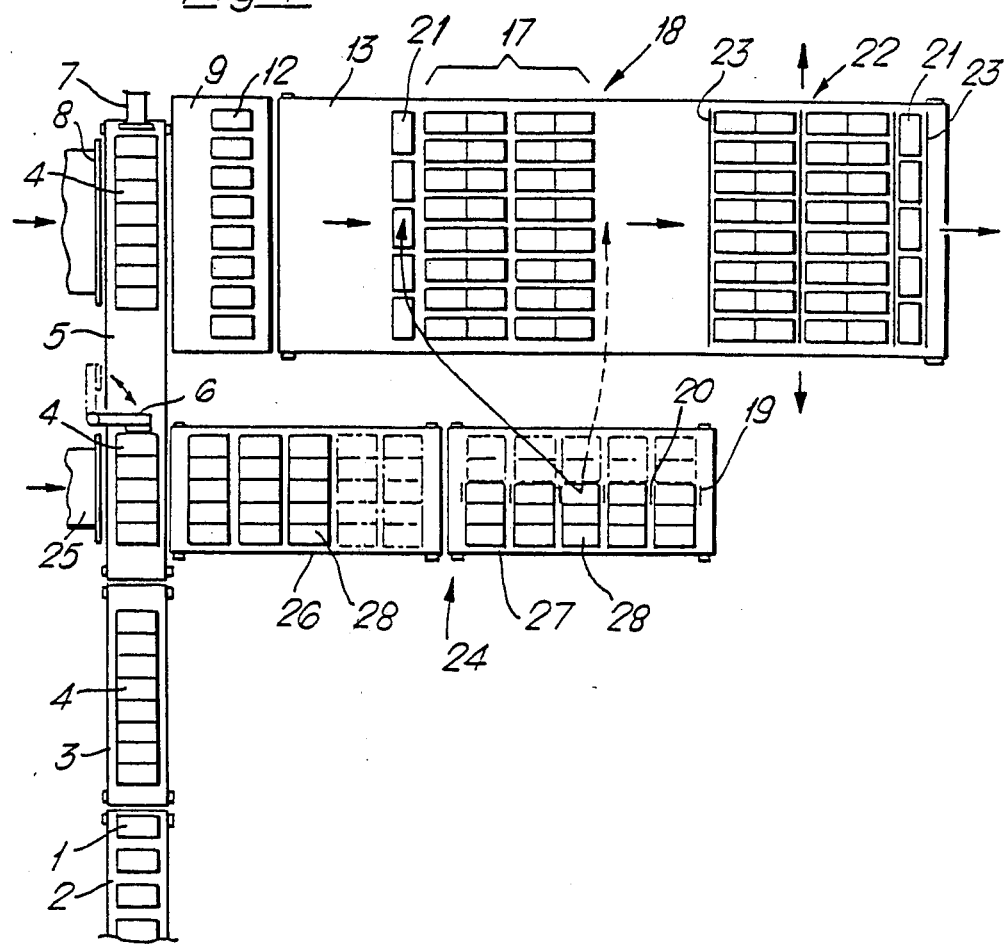

United States Patent [19]

Lingl, Jr. et al.

[11] 4,273,489
[45] Jun. 16, 1981

[54] PROCESS AND APPARATUS FOR FORMING OF SET LAYERS FROM BRICK BLANKS

[75] Inventors: Hans Lingl, Jr., Neu-Ulm; Josef Schwarz, Vöhringen, both of Fed. Rep. of Germany

[73] Assignee: Lingl Corporation, Paris, Tenn.

[21] Appl. No.: 972,718

[22] Filed: Dec. 26, 1978

[30] Foreign Application Priority Data

Dec. 29, 1977 [DE] Fed. Rep. of Germany ....... 2758648

[51] Int. Cl.³ .............................................. B65G 57/26
[52] U.S. Cl. ..................................... 414/60; 198/434; 414/68; 414/786
[58] Field of Search ....................... 414/57, 62, 60, 68, 414/786; 198/368, 374, 429, 430, 436, 434, 458

[56] References Cited

U.S. PATENT DOCUMENTS

| 2,942,715 | 6/1960 | Miller .............................. 198/368 X |
| 3,487,954 | 1/1970 | Pearne et al. ....................... 414/60 X |
| 3,529,331 | 9/1970 | Patin ................................. 414/60 X |
| 3,589,495 | 6/1971 | Pearne et al. ....................... 414/60 X |
| 3,625,375 | 12/1971 | Lingl ............................... 414/786 X |
| 4,014,441 | 3/1977 | Osborn et al. ................... 198/374 X |
| 4,083,275 | 4/1978 | Lingl ............................... 198/458 X |

FOREIGN PATENT DOCUMENTS

| 838036 | 1/1976 | Belgium . |
| 1608681 | 9/1969 | Fed. Rep. of Germany ............ 414/62 |
| 2155035 | 1/1973 | Fed. Rep. of Germany . |
| 2023676 | 4/1976 | Fed. Rep. of Germany . |
| 2447341 | 4/1976 | Fed. Rep. of Germany . |
| 1417463 | 10/1965 | France . |
| 2148437 | 3/1973 | France . |
| 1015171 | 12/1965 | United Kingdom . |
| 1088243 | 10/1967 | United Kingdom . |
| 1134875 | 11/1968 | United Kingdom . |
| 1169449 | 11/1969 | United Kingdom . |
| 1249850 | 10/1971 | United Kingdom . |
| 1431522 | 4/1976 | United Kingdom . |
| 1508896 | 4/1978 | United Kingdom . |

*Primary Examiner*—Leslie J. Paperner
*Attorney, Agent, or Firm*—Cushman, Darby & Cushman

[57] ABSTRACT

An improved process and apparatus for forming layers of bricks in which rows within the layer can have the same or differing orientations. The bricks are conveyed in closed or substantially closed rows along a first conveyor. Two other conveyor systems are fed therefrom. On one of these two other conveyor systems, bricks are moved initially to a displacement device and spread apart in a direction longitudinally of the row and are thereafter transferred downstream to form, on a conveyor, a layer or partial layer. When partial layers are formed, that partial layer can be supplemented by transferring a layer of rows of bricks from a preparatory layer formed on the other conveyor system. When such bricks are transferred from the preparatory layer, they are simultaneously rotated through 90° prior to their being deposited to complete the partial layer.

25 Claims, 7 Drawing Figures

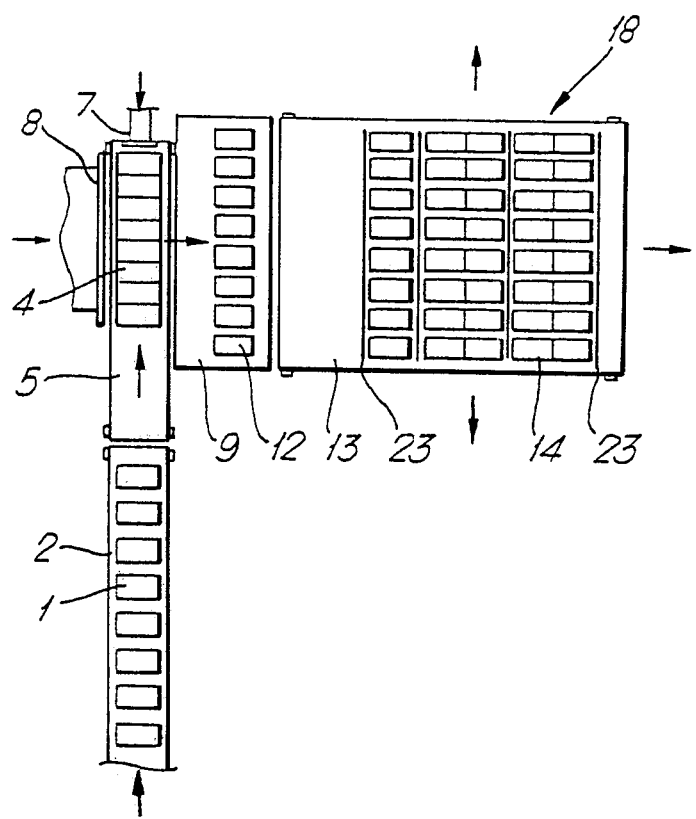

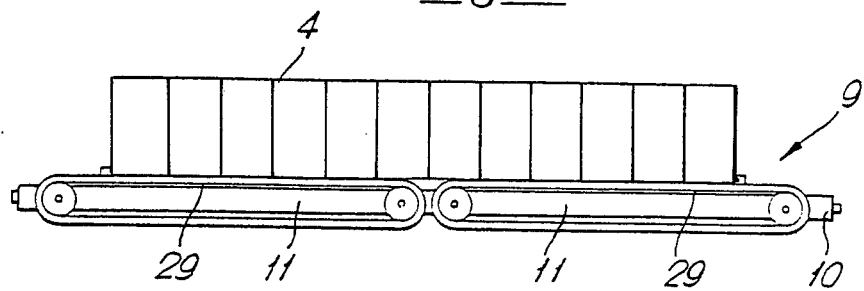
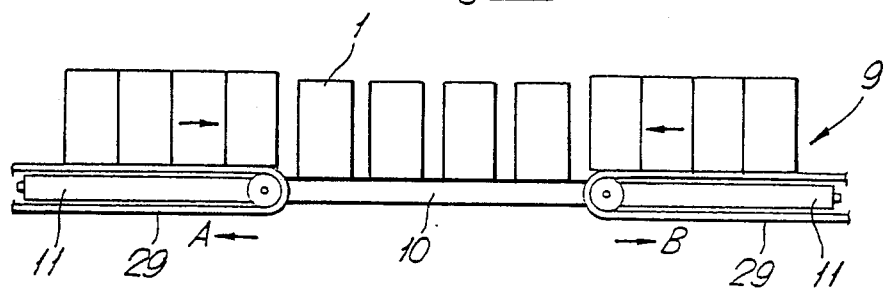
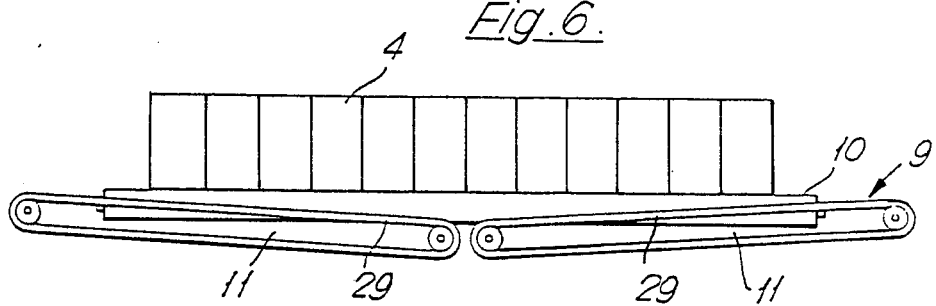
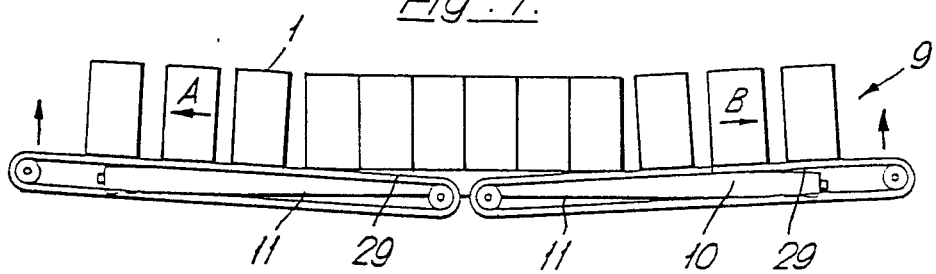

PROCESS AND APPARATUS FOR FORMING OF SET LAYERS FROM BRICK BLANKS

DESCRIPTION OF INVENTION

This invention relates to a method of, and an apparatus suitable for use in, forming a layer of green bricks, in which layer rows of the bricks can have same or differing orientations. The layers can be square or rectangular.

German Patent Specification No. 2,312,946 discloses a method of forming set layers from green bricks and an apparatus for performing the method wherein bricks which have been pushed close together in longitudinal and transverse rows to form an initial set layer are raised slightly off a support by a carrying element and moved in the direction of the longitudinal rows until the row which is at the front as considered in the direction of movement abuts a resistance which pushes at least the rearmost raised cross-row of bricks back onto the support. Whereafter, upon cessation of the resistance, the other raised transverse rows move on a required transverse interval, so that the renewed action of the appropriately adjusted resistance pushes at least one more transverse row back onto the support. A set layer having the required intervals between the various transverse rows or groups thereof is thereby formed after all the transverse rows have been pushed back stepwise onto the support in this manner.

Unfortunately, with this method, for example freshly extruded wet bricks cannot be displaced satisfactorily for direct setting on kiln cars in the stiff extrusion method, for when the layer of bricks is displaced on the carrying element the bricks are pressed together by way of their cut faces and stick together. Also, the apparatus is of limited output since the displacement is in one direction and the carrying element must be displaced over the whole width of the layer. Another disadvantage is that delicate articles are damaged because they rub for a long time on the carrying element. Furthermore, this apparatus cannot be used to set layers in which the bricks in the rows of the layer are of differing shapes and orientations.

A method of and apparatus for forming set layers of rectangular plan is described in German Patent Specification No. 2,447,341 wherein, before each formation of the compact layer, the bricks in the longitudinal rows are brought to a predetermined number by removal of some bricks, the predetermined number corresponding to the number of bricks in the longitudinal rows of the re-formed set layers. The removed bricks are collected and stored until the stored bricks correspond to the set layers and are then supplied to the grouping device to form set layers. This apparatus is very complex, difficult to adjust and expensive to service.

Other apparatus has been proposed for forming set layers of different configuration and so are apparatus for forming layers from rows of bricks wherein the bricks have different orientations. Unfortunately, all of them are very expensive and elaborate and difficult to service.

According to a first aspect of the present invention there is provided a method of forming a layer of green bricks, in which layer rows of the bricks can have the same or differing orientations, which method comprises conveying using first conveyor means bricks in a row, adjacent bricks being near to or in contact with each other, the row being transferred to a displacement device arranged to receive a row from the first conveyor means, bricks of the row being spaced apart from each other longitudinally of the row by the displacement device, transferring the separated rows to second conveyor means transversely of the longitudinal axis of the row to form on the second conveyor means a layer or partial layer, transferring, to supplement the partial layer if required, further bricks in a row from the first conveyor means to a preparatory device comprising third conveyor means, adjacent bricks of the further row being near to or in contact with each other, the third conveyor means conveying the further row transversely of the longitudinal axis of the further row and substantially parallel to the direction of conveyance of the rows on the second conveyor means to form a preparatory layer, transferring, using first transfer gripper means, the preparatory layer or a row from the preparatory layer with simultaneous rotation through 90° to the second conveyor means to supplement the partial layer and transferring, using second transfer gripper means, the layer from the second conveyor means.

According to a second aspect of the present invention there is provided an apparatus suitable for use in forming a layer of green bricks, in which layer rows of the bricks can have the same or differing orientations, which apparatus comprises first conveyor means for conveying bricks in a row, adjacent bricks being near to or in contact with each other, a displacement device arranged to receive a row from the first conveyor means and adapted to space the bricks of the row apart from each other longitudinally of the row, second conveyor means on which a layer or partial layer of rows is to be formed, in use, the second conveyor means being arranged such that the separated row can be transferred thereto, in use, transversely of the longitudinal axis of the row, to form the layer or partial layer, a preparatory device for preparing rows, if required, to supplement the partial layer, the preparatory device comprising third conveyor means for receiving further bricks in a row from the first conveyor means, adjacent bricks of the further row being near to or in contact with each other, the third conveyor means being arranged to convey the further row transversely of the longitudinal axis thereof and substantially parallel to the direction of conveyance of the row on the second conveyor means, the further rows on the third conveyor means forming, in use, a preparatory layer, first transfer gripper means for transferring the preparatory layer or a row from the preparatory layer to the second conveyor means with simultaneous rotation through 90° to supplement the partial layer and second transfer gripper means for transferring the layer formed on the second conveyor means from the second conveyor means.

A preferred embodiment of this invention provides an apparatus and method for forming set layers of differing configurations, the layers comprising rows of wet or dry bricks having the same or differing orientations, without the bricks substantially rubbing on a support during displacement, the apparatus being simple, taking up little space and being cheap to service.

Advantageously, rows, each comprising a predetermined number of bricks, the number being variable by programming, are conveyed selectively by the first conveyor means against first abutment means pivotable inwardly into the conveying path of the first conveyor means or against second abutment means movable, by programming, along the conveyor path of the first conveyor means, the first abutment means positioning the row for feeding to the preparatory device and the second abutment means positioning the row, which row varies in length depending on the shape and size of the layer to be formed, and centering the row relative to the centre of the displacement device for feeding the row transversely of the longitudinal axis of the row to the displacement device, the rows positioned by the first and second abutment means being pushed to the preparatory device and to the displacement means, respectively. The third conveyor means of the preparatory device can comprise a first conveyor belt for receiving rows from the first conveyor means, the rows forming the preparatory layer, and a second conveyor belt for receiving the preparatory layer from the first conveyor belt, the first transfer gripper means transferring a row of the preparatory layer or the preparatory layer to the second conveyor means. Preferably, a partial layer is formed on the second conveyor means, which second conveyor means comprises a conveyor belt, wherein to complete the partial layer the first transfer gripper means transfers a row of the preparatory layer, which row extends substantially parallel to the direction of conveyance of the rows on the second conveyor means, to the second conveyor means and wherein the complete layer is further conveyed by the second conveyor means to a location where the second transfer gripper means grips the complete layer for transferring the complete layer from the second conveyor means.

In one embodiment, the displacement device comprises a roller table having spaced apart driven rollers and two conveyors situated end to end and having conveyor belts, the conveyor belts being movable between the spaced apart driven rollers such that each conveyor can contact half a row, which row is received from the first conveyor means and is supported by the driven rollers, and can lift the respective half row off the driven rollers, wherein, after lifting, the conveyors move away from each other in opposite directions longitudinally of the row while the conveyor belts thereof are driven at the same speed but in the opposite directions to the movement of the respective conveyors so that the conveyor belts move relative to and below bricks of the respective half row thereby transferring the bricks onto the driven rollers and, after such transfer, the drive of the conveyor belts of each conveyor being interrupted in programmed manner in order to obtain predetermined spaces between a transferred brick and the adjacent brick which is supported by the conveyor belt. Alternatively, the displacement device can comprise a roller table having spaced apart driven rollers and two conveyors situated end to end and having conveyor belts inclined in a plane extending longitudinally of the row situated, in use, thereon, the belts of the two conveyors being disposed in a mirror image relationship to one another and being movable between the spaced apart driven rollers such that, on simultaneous lifting of the conveyor belts of the two conveyors, the bricks of the row, which row is situated on the driven rollers, starting at each end of the row, are sequentially contacted by the conveyor belts, the conveyor belts of the two conveyor means being driven, during lifting, in programmed manner in opposite directions to each other thereby spacing the bricks a predetermined distance apart.

A preferred embodiment of this invention has the advantage that a simple and compact apparatus can be used to form set layers of different kinds which are for example square or rectangular, the rectangle being variable in accordance with the placement of the rows of the bricks in the layer. It is also possible to form layers from rows of bricks in which the bricks have differing orientations for adaptation of layer size for example to the size of the kiln car platform in the case of different brick shapes and to obtain the most stable form of group.

Another advantage of a preferred embodiment is that the bricks do not rub during displacement; consequently, the preferred embodiment apparatus and method can be used universally for wet and dry bricks and for sensitive articles without damaging the brick seating surface or the brick edges.

In an advantageous embodiment of this invention closed rows of bricks, each comprising a predetermined but programmable number of bricks, are in known manner formed during the transfer of the bricks from a first to a second conveyor of the first conveyor means. The rows are transferred to a third conveyor of the second conveyor means which moves them against first or second abutment means for transfer of the rows either to the preparatory device or to the displacement device. The first abutment means is pivotable inwardly into the conveying path of the first conveyor means and pivotable outwardly to clear the path so that a clear run can be left and hence the rows can be conveyed as far as the second abutment means. The second abutment means has adjustable stopping positions for the positioning of rows of differing lengths for example for rectangular layers. With the second abutment means in a second stop position, the closed rows of bricks are transferred by second pusher means to a programmable displacement device comprising spaced apart driven rollers whose speed of conveyance corresponds to the speed of transfer provided by the second pusher means, the displacement device also comprising two conveyors situated end to end which engage in the gaps between the spaced apart rollers and which so displace one half each of the closed row during or after disengagement from the rollers that predetermined programmable intervals are obtained between the bricks of the row, so that the length of the displaced row corresponds to the width of the set layer in the direction of conveyance on the second conveyor means, the second conveyor means comprising a setting belt. Upon completion of the displacement step, the driven rollers transfer the displaced or separated row to the setting belt and the displacement device simultaneously receives a new closed row of bricks. The setting belt is so driven in programmed manner that the displaced rows of bricks are collected into set layers.

If it is required to form set layers with rows of bricks having a differing orientation from the bricks in the displaced rows, a partial layer formed from the displaced rows is conveyed onwards on the setting belt to a first standby position to which rows from the preparatory device and having differently orientated bricks can be transferred by first transfer gripper means to complete the layer. The complete set layer is then conveyed into a second standby position to be taken up by the second transfer gripper means, a new partial layer simultaneously entering the first standby position. The preparatory device comprises two conveyor belts. The first conveyor belt serves to collect a layer of closed rows which are positioned by first abutment means and transferred by first pusher means to the conveyor belt, the same so advancing that predetermined intervals arise between the closed rows. The second belt serves to prepare the layer for separation by the resetting gripper which engages seriatim from one side to the other the transverse rows of the prepared set layer and resets them on the setting belt to amplify the partial layer.

Figure 2:
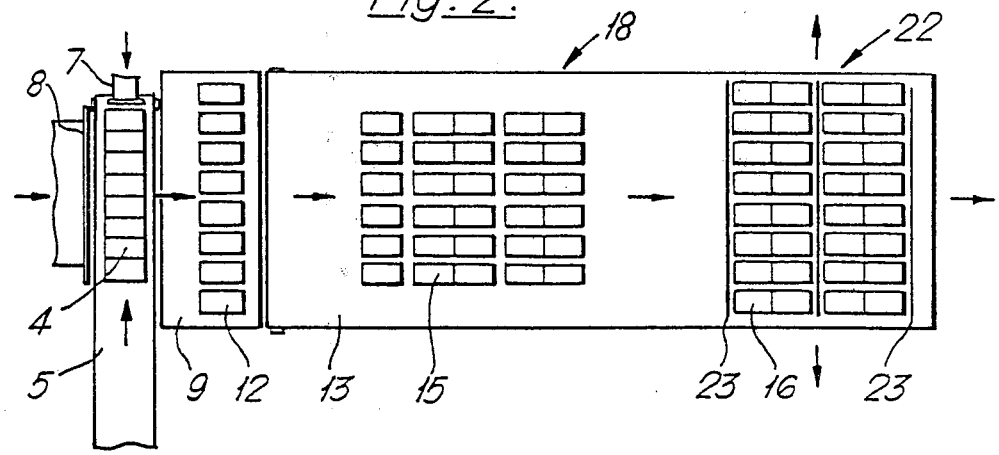

For a better understanding of this invention and to show how the same may be put into effect, reference will now be made, by way of example, to the accompanying drawings, in which:

FIG. 1 shows a plan view of an embodiment of an apparatus in accordance with this invention for forming set layers, some of the rows of the layers having bricks orientated differently from bricks of the other rows of the layer, FIG. 2 shows a partial plan view of the apparatus of FIG. 1 in the formation of rectangular set layers in which all the bricks have the same orientation, FIG. 3 shows a simplified embodiment of a method in accordance with this invention for forming set layers in which all the bricks have the same orientation, FIG. 4 shows an elevational view of an embodiment of the displacement device of the apparatus of FIG. 1 in its initial position and with closed rows of bricks, FIG. 5 shows an elevational view of the displacement device of FIG. 4 during displacement of the bricks, FIG. 6 shows an elevational view of another embodiment of the displacement device in its initial position with a closed row of bricks, and FIG. 7 shows an elevational view of the displacement device of FIG. 6 during displacement of the bricks.

Referring to FIG. 1 of the drawings, bricks 1 in spaced-apart relationship to one another are, in known manner, so transferred from a first conveyor 2 to a second conveyor 3 that closed brick rows 4 are formed for example by programmed periodic reduction of the speed of the conveyor 3 relative to that of the conveyor 2; each row 4 containing a predetermined number of bricks. A third conveyor 5 following the second conveyor 3 conveys the closed rows 4 selectively against a first inwardly pivotable abutment 6 or against a second abutment 7 which is movable in the conveying direction. The row 4, after positioning by the abutment 7 so as to be centered relative to the centre of a displacement device 9, is transferred by a pusher 8 to the displacement device 9 comprising spaced apart driven rollers. The row 4 is pushed by the pusher 8 onto the driven rollers whose speed of conveyance corresponds to the speed of transfer provided by the pusher 8. The displacement device 9 also comprises two conveyors 11 situated end to end (see FIG. 4) and having narrow belts which extend into the gaps between the spaced apart rollers of a roller table 10, each conveyor 11 being adapted to receive half of the closed row 4. The conveyors 11 each lift a respective half of the closed row 4 off the rollers of the roller table 10. Simultaneously, the conveyors 11 are moved apart from one another outwardly, and at the same speed as one another, in direction A and B (see FIG. 5) and longitudinally of the row. The belts of the conveyors 11 are so driven as to convey the halves of the row 4 in opposite directions to the outwards movement of the respective conveyors 11, the belts unwinding below the bricks 1 so that the same are transferred to the roller table 10.

The drive of the belts of the conveyors 11 is interrupted in programmed manner after every transfer of a brick 1 in order to obtain predetermined spaces between a transferred brick and the adjacent brick which is supported by the conveyor belt.

An alternative displacement device 9 shown in FIGS. 6 and 7 also comprises a roller table 10 having spaced apart driven rollers and two conveyors 11 situated end to end and having narrow conveyor belts 29 movable between the spaced apart driven rollers. However, in this displacement device 9, the conveyor belts 29 are inclined in a plane extending longitudinally of the row 4, as shown, the conveyor belts 29 being disposed in mirror image relationship to one another. In this displacement device 9 the closed row 4, starting from the outside, is lifted off the roller table 10 by simultaneous lifting of the belts 29 of the conveyors 11 which are disposed in planes at a mirror image inclination to one another, the belts 29 being so driven that, starting at the ends of the row 4, the bricks 1 are moved outwardly, the operative movement of the conveyor 11 being so controlled as to be adapted and to be interrupted in programmed manner so that predetermined intervals arise between the displaced bricks 1 of the row 4.

Upon completion of the displacement step, wherein bricks of the row have been spaced apart from each other longitudinally of the row, the driven rollers transfer the displaced or separated rows 12 transversely of the longitudinal axis of the row to a setting belt 13 and the displacement device can, if required, simultaneously receive a new row of bricks. The setting belt 13 is so driven in programmed manner that the displaced rows of bricks are collected into set layers 14 (FIG. 3), 15 and 16 (FIG. 2) or a partial layer 17 (FIG. 1).

The partial layer 17 is placed in a standby position 18 for completing the layer; in the position 18 a resetting gripper 19, which has intermediate tongues 20, so adds to the setting belt 13 one or more rows 21 that the bricks 1 thereof are orientated at right-angles to the bricks 1 of the partial layer 17. After the same has been completed, it is conveyed to a second standby position 22 where it can be removed by a setting gripper 23 and transferred to a setting plate or panel.

The rows 21 are prepared in a separate preparatory device 24 comprising a pusher 25, first conveyor belt 26 and a second conveyor belt 27; rows 4 each preferably containing a predetermined constant number of bricks 1 are positioned by means of the inwardly pivotable abutment 6 and transferred by the pusher 25 to the first conveyor belt 26 on which a layer 28 consisting of closed rows 4 with predetermined intervals between the rows is collected. As can be seen from FIG. 1, the first and second conveyor belts 26 and 27 convey the row 4 transversely of the longitudinal axis of the row 4 and substantially parallel to the direction of conveyance of the setting belt 13. The layer 28 is transferred to the second belt 27 on which the cross-rows of the layer 28 are engaged from one side to the other stepwise by the resetting gripper 19 and transferred, with simultaneous rotation through 90°, to the setting belt 13, in position 18, to complete the partial layer 17.

To produce rectangular set layers 15, 16 having a different number of bricks 1 in the rows 4 and a different number of rows, the abutment 7 at the end of the conveyor 5 has its movements so programmed that the different lengths of the rows 4 can be compensated for and the same can be centered relatively to the displacement device 9.

If it is required merely to have bricks 1 with the same orientation in the layers 14 to 16, the second conveyor 3 the first abutment 6, the pusher 25 and the preparatory device 24 with the resetting gripper 19 can be simply not used or can be omitted and the setting belt 13 can be shortened, the gripper 23 providing removal from position 18.

The claims defining the invention are as follows:
We claim:

1. A method of forming a layer of green bricks, in which layer rows of the bricks can have the same or differing orientations, which method comprises conveying using first conveyor means bricks in a row, adjacent bricks being near to or in contact with each other, the row being transferred to a displacement device arranged to receive a row from the first conveyor means, bricks of the row being spaced apart from each other longitudinally of the row by the displacement device, transferring the separated rows to second conveyor means transversely of the longitudinal axis of the row to form on the second conveyor means a layer or partial layer, transferring, to supplement the partial layer if required, further bricks in a row from the first conveyor means to a preparatory device comprising third conveyor means, adjacent bricks of the further row being near to or in contact with each other, the third conveyor means conveying the further row transversely of the longitudinal axis of the further row and substantially parallel to the direction of conveyance of the rows on the second conveyor means to form a preparatory layer, transferring, using first transfer gripper means, the preparatory layer or a row from the preparatory layer with simultaneous rotation through 90° to the second conveyor means to supplement the partial layer and transferring, using second transfer gripper means, the layer from the second conveyor means.

2. A method according to claim 1, wherein rows each comprising a predetermined number of bricks, the number being variable by programming, are conveyed selectively by the first conveyor means against first abutment means pivotable inwardly into the conveying path of the first conveyor means or against second abutment means movable, by programming, along the conveyor path of the first conveyor means, the first abutment means positioning the row for feeding to the preparatory device and the second abutment means positioning the row, which row varies in length depending on the shape and size of the layer to be formed, and centering the row relative to the centre of the displacement device for feeding the row transversely of the longitudinal axis of the row to the displacement device, the rows positioned by the first and second abutment means being pushed to the preparatory device and to the displacement means, respectively.

3. A method according to claim 1 or 2, wherein the third conveyor means of the preparatory device comprises a first conveyor belt for receiving rows from the first conveyor means, the rows forming the preparatory layer, and a second conveyor belt for receiving the preparatory layer from the first conveyor belt, the first transfer gripper means transferring a row of the preparatory layer or the preparatory layer to the second conveyor means.

4. A method according to claim 3, wherein a partial layer is formed on the second conveyor means, which second conveyor means comprises a conveyor belt, wherein to complete the partial layer the first transfer gripper means transfers a row of the preparatory layer, which row extends substantially parallel to the direction of conveyance of the rows on the second conveyor means, to the second conveyor means and wherein the complete layer is further conveyed by the second conveyor means to a location where the second transfer gripper means grips the complete layer for transferring the complete layer from the second conveyor means.

5. A method according to any one of claims 1 or 2, wherein the displacement device comprises a roller table having spaced apart driven rollers and two conveyors situated end to end and having conveyor belts, the conveyor belts being movable between the spaced apart driven rollers such that each conveyor can contact half a row, which row is received from the first conveyor means and is supported by the driven rollers, and can lift the respective half row off the driven rollers, wherein, after lifting, the conveyors move away from each other in opposite directions longitudinally of the row while the conveyor belts thereof are driven at the same speed but in the opposite directions to the movement of the respective conveyors so that the conveyor belts move relative to and below bricks of the respective half row thereby transferring the bricks onto the driven rollers and, after such transfer, the drive of the conveyor belts of each conveyor being interrupted in programmed manner in order to obtain predetermined spaces between a transferred brick and the adjacent brick which is supported by the conveyor belt.

6. A method according to any one of claims 1 or 2, wherein the displacement device comprises a roller table having spaced apart driven rollers and two conveyors situated end to end and having conveyor belts inclined in a plane extending longitudinally of the row situated, in use, thereon, the belts of the two conveyors being disposed in a mirror image relationship to one another and being movable between the spaced apart driven rollers such that, on simultaneous lifting of the conveyor belts of the two conveyors, the bricks of the row, which row is situated on the driven rollers, starting at each end of the row, are sequentially contacted by the conveyor belts, the conveyor belts of the two conveyor means being driven, during lifting, in programmed manner in opposite directions to each other thereby spacing the bricks a predetermined distance apart.

7. A method according to claim 3, wherein the displacement device comprises a roller table having spaced apart driven rollers and two conveyors situated end to end and having conveyor belts, the conveyor belts being movable between the spaced apart driven rollers such that each conveyor can contact half a row, which row is received from the first conveyor means and is supported by the driven rollers, and can lift the respective half row off the driven rollers, wherein, after lifting, the conveyors move away from each other in opposite directions longitudinally of the row while the conveyor belts thereof are driven at the same speed but in the opposite directions to the movement of the respective conveyors so that the conveyor belts move relative to and below bricks of the respective half row thereby transferring the bricks onto the driven rollers and, after such transfer, the drive of the conveyor belts of each conveyor being interrupted in programmed manner in order to obtain predetermined spaces between a transferred brick and the adjacent brick which is supported by the conveyor belt.

8. A method according to claim 3, wherein the displacement device comprises a roller table having spaced apart driven rollers and two conveyors situated end to end and having conveyor belts inclined in a plane extending longitudinally of the row situated, in use, thereon, the belts of the two conveyors being disposed in a mirror image relationship to one another and being movable between the spaced apart driven rollers such that, on simultaneous lifting of the conveyor belts of the two conveyors, the bricks of the row, which row is situated on the driven rollers, starting at each end of the row, are sequentially contacted by the conveyor belts, the conveyor belts of the two conveyors means being driven, during lifting, in programmed manner in opposite directions to each other thereby spacing the bricks a predetermined distance apart.

9. A method as in claim 1 including the additional step of spacing apart each of the further rows transferred to the preparatory device a predetermined distance in the conveying direction of the third conveyor means.

10. An apparatus suitable for use in forming a layer of green bricks, in which layer rows of the bricks can have the same or differing orientations, which apparatus comprises first conveyor means for conveying bricks in a row, adjacent bricks being near to or in contact with each other, a displacement device arranged to receive a row from the first conveyor means and adapted to space the bricks of the row apart from each other longitudinally of the row, second conveyor means on which a layer or partial layer of rows is to be formed, in use, the second conveyor means being arranged such that the separated row can be transferred thereto, in use, transversely of the longitudinal axis of the row, to form the layer or partial layer, a preparatory device for preparing rows, if required, to supplement the partial layer, the preparatory device comprising third conveyor means for receiving further bricks in a row from the first conveyor means, adjacent bricks of the further row being near to or in contact with each other, the third conveyor means being arranged to conveythe further row transversely of the longitudinal axis thereof and substantially parallel to the direction of conveyance of the row on the second conveyor means, the further rows on the third conveyor means forming, in use, a preparatory layer, first transfer gripper means for transferring the preparatory layer or a row from the preparatory layer to the secondary conveyor means with simultaneous rotation through 90° to supplement the partial layer and second transfer gripper means for transferring the layer formed on the second conveyor means from the second conveyor means.

11. An apparatus according to claim 10, wherein the first conveyor means comprises a series of conveyors for forming rows comprising a predetermined but programmedly variable number of bricks, wherein first pivotable abutment means are provided for pivoting inwardly into the conveying path of the first conveyor means for positioning a row for feed to the preparatory device, wherein second abutment means movable along the conveying path of the first conveyor means are provided for positioning a row for feed to the displacement device and for centering the row relative to the displacement device and wherein first and second pusher means are provided for pushing, respectively, rows positioned by the first and second abutment means to the preparatory device and displacement device, respectively.

12. An apparatus according to claim 10 or 11, wherein the preparatory device comprises first and second conveyor belts, the first conveyor belt being drivable in programmed manner such that the preparatory layer consists of a number of the further rows, the further rows being spaced apart from each other by predetermined distances, which preparatory layer or a row of the preparatory layer is transferred, in use, by the first transfer gripper means.

13. An apparatus according to claim 12, wherein the second conveyor means can be so driven, in use, such that the layer or the partial layer can be formed selectively from the separated rows, such that the partial layer can be conveyed to a location to which the first transfer gripper means transfers the preparatory layer or row thereof, and such that the completed layer can be transferred to a position for engagement by the second transfer gripper means.

14. An apparatus according to claim 12, wherein the displacement device comprises a roller table having spaced apart driven rollers and two conveyors situated end to end and having conveyor belts, the conveyor belts being movable between the spaced driven rollers such that each conveyor can contact, in use, half a row, which row is received in use, from the first conveyor means and is supported by the driven rollers, the conveyors being movable, after lifting, away from each other in opposite directions longitudinally of the row and the conveyor belts being drivable during said movement at the same speed but in the opposite directions to the movement so that the conveyor belts move, in use, relative to and below bricks of the respective half row thereby transferring the bricks onto the rollers and means for interrupting in programmed manner the drive of the conveyor belts of each conveyor in order to obtain predetermined spaces between a transferred brick and the adjacent brick which is supported by the conveyor belt.

15. An apparatus according to claim 12, wherein the displacement device comprises a roller table having spaced apart driven rollers and two conveyors situated end to end and having conveyor belts inclined in a plane extending longitudinally of the row situated, in use, thereon, the belts of the two conveyors being disposed in a mirror image relationship to one another and being movable between the spaced apart driven rollers such that, on simultaneous lifting, in use, of the conveyor belts of the two conveyors, the bricks of the row, which row is situated, in use, on the driven rollers, starting at each end of the row are sequentially contacted by the conveyor belts, the conveyor belts of the two conveyors being drivable, during lifting, in programmed manner in opposite directions to each other thereby spacing, in use, the bricks a predetermined distance apart.

16. An apparatus according to claim 10 or 11, wherein the second conveyor means can be so driven, in use, such that the layer or the partial layer can be formed selectively from the separated rows, such that the partial layer can be conveyed to a location to which the first transfer gripper means transfers the preparatory layer or row thereof, and such that the completed layer can be transferred to a position for engagement by the second transfer gripper means.

17. An apparatus according to claim 16, wherein the displacement device comprises a roller table having spaced apart driven rollers and two conveyors situated end to end and having conveyor belts, the conveyor belts being movable between the spaced apart driven rollers such that each conveyor can contact, in use, half a row, which row is received, in use, from the first conveyor means and is supported by the driven rollers, the conveyors being movable, after lifting, away from each other in opposite directions longitudinally of the row and the conveyor belts being drivable during said movement at the same speed but in the opposite directions to the movement so that the conveyor belts move, in use, relative to and below bricks of the respective half row thereby transferring the bricks onto the rollers and means for interrupting in programmed manner the drive of the conveyor belts of each conveyor in order to obtain predetermined spaces between a transferred brick and the adjacent brick which is supported by the conveyor belt.

18. An apparatus according to claim 16, wherein the displacement device comprises a roller table having spaced apart driven rollers and two conveyors situated end to end and having conveyor belts inclined in a place extending longitudinally of the row situated, in use, thereon, the belts of the two conveyors being disposed in a mirror image relationship to one another and being movable between the spaced apart driven rollers such that, on simultaneous lifting, in use, of the conveyor belts of the two conveyors, the bricks of the row, which row is situated, in use, on the driven rollers, starting at each end of the row are sequentially contacted by the conveyor belts, the conveyor belts of the two conveyors being drivable, during lifting, in programmed manner in opposite directions to each other thereby spacing, in use, the bricks a predetermined distance apart.

19. An apparatus according to any one of claims 10 or 11, wherein the displacement device comprises a roller table having spaced apart driven rollers and two conveyors situated end to end and having conveyor belts, the conveyor belts being movable between the spaced apart driven rollers such that each conveyor can contact, in use, half a row, which row is received, in use, from the first conveyor means and is supported by the driven rollers, the conveyors being movable, after lifting, away from each other in opposite directions longitudinally of the row and the conveyor belts being drivable during said movement at the same speed but in the opposite directions to the movement so that the conveyor belts move, in use, relative to and below bricks of the respective half row thereby transferring the bricks onto the rollers and means for interrupting in programmed manner the drive of the conveyor belts of each conveyor in order to obtain predetermined spaces between a transferred brick and the adjacent brick which is supported by the conveyor belt.

20. An apparatus according to any one of claims 10 or 11, wherein the displacement device comprises a roller table having spaced apart driven rollers and two conveyors situated end to end and having conveyor belts inclined in a plane extending longitudinally of the row situated, in use, thereon, the belts of the two conveyors being disposed in a mirror image relationship to one another and being movable between the spaced apart driven rollers such that, on simultaneous lifting, in use, of the conveyor belts of the two conveyors, the bricks of the row, which row is situated, in use, on the driven rollers, starting at each end of the row are sequentially contacted by the conveyor belts, the conveyor belts of the two conveyors being drivable, during lifting, in programmed manner in opposite directions to each other thereby spacing, in use, the bricks a predetermined distance apart.

21. A process for forming layers from rows of bricks including the steps of forming a closed row of bricks on a first conveyor system, conveying the closed row past a first and toward a second downstream stop device and selectively stopping the closed row at either a first or second position as determined by the first or second stop device, transferring the row of blanks stopped at the first position onto a second conveyor system, collecting a plurality of spaced apart rows on the second conveyor system so as to form a preparatory layer thereon, transferring the row of bricks stopped at the second position to a third conveyor system, separating the bricks when initially transferred to the third conveyor system to space the bricks one from another longitudinally along the row, moving the row of spaced apart bricks downstream on the third conveyor system and collecting such rows to form at least a partially formed layer, transferring a predetermined portion of said preparatory layer from said second conveyor system to a predetermined position on said third conveyor system adjacent the partial layer held thereon to complete the layer on the third conveyor system and removing completed layers from said third conveyor system.

22. The process as in claim 21 wherein the step of transferring a predetermined portion of the preparatory layer includes the step of engaging in seriatim from one side to the other transverse rows of bricks from said preparatory layer.

23. The process as in claim 21 or 22 including the additional step of spacing apart the rows of bricks transferred to said second conveyor system.

24. Apparatus for forming layers of bricks in which the orientation of rows of bricks within layers can vary comprising first, second and third conveyor systems, said first conveyor system feeding said second and third conveyor systems and having first conveyor means for forming incoming brick blanks into closed rows of bricks, first stop means provided downstream from said first conveyor means at a first location along the length thereof adjacent said second conveyor system, for selectively stopping a row of bricks, second stop means positioned at a second location downstream from said first location, adjacent said third conveyor system, for stopping rows of bricks not stopped by said first stop means at a predetermined position, means for moving the row of bricks stopped by said first stops means onto said second conveyor system so that a preparatory layer can be formed thereon, means for moving the row of bricks stopped by said second stop means onto said third conveyor system, said third conveyor system including spacing means for spacing apart individual bricks longitudinally of the row moved onto said third conveyor system and setting conveyor means for collecting a plurality of rows of bricks from said spacing means so that at least a partial layer is formed thereon and transfer means for transferring at least a portion of the preparatory layer from said second conveyor system to said third conveyor system.

25. The apparatus as in claim 24 wherein said second stop means is adjustable in a direction parallel with the feed direction of said first conveyor means so that rows of differing lengths can be properly stopped adjacent said third conveyor system.

* * * * *